United States Patent [19]

Era et al.

[11] Patent Number: 5,020,883
[45] Date of Patent: Jun. 4, 1991

[54] FERROELECTRIC LIQUID CRYSTAL DEVICE

[75] Inventors: Susumu Era, Hitachi; Kishiro Iwasaki, Hitachiota; Hisao Yokokura, Hitachi; Yasuo Hanawa, Katsuta; Katsumi Kondo, Hitachi; Tadao Nakada; Teruo Kitamura, both of Katsuta; Akio Mukoh, Mito, all of Japan

[73] Assignee: Hitachi, Ltd., Tokyo, Japan

[21] Appl. No.: 263,982

[22] Filed: Oct. 27, 1988

Related U.S. Application Data

[62] Division of Ser. No. 849,382, Apr. 8, 1986, abandoned.

[30] Foreign Application Priority Data

Apr. 8, 1985 [JP] Japan .................................. 60-72642

[51] Int. Cl.$^5$ ........................ G02F 1/13; C09K 19/52
[52] U.S. Cl. ..................... 350/350 S; 252/299.4; 252/299.01
[58] Field of Search ............... 252/299.4; 350/339 R, 350/340, 341, 343, 350 S

[56] References Cited

U.S. PATENT DOCUMENTS

| | | | |
|---|---|---|---|
| 4,367,924 | 1/1983 | Clark et al. | 350/350 S |
| 4,381,886 | 5/1983 | Yokokura et al. | 350/340 |
| 4,401,537 | 8/1983 | Chern et al. | 428/1 |
| 4,418,102 | 11/1983 | Ferrato | 428/1 |
| 4,494,824 | 1/1985 | Nakamura et al. | 350/334 |
| 4,561,726 | 12/1985 | Goodby et al. | 350/341 |
| 4,586,790 | 5/1986 | Umeda et al. | 350/337 |
| 4,586,791 | 5/1986 | Isogai et al. | 350/341 |
| 4,619,500 | 10/1986 | Ahne et al. | 350/341 |
| 4,634,228 | 1/1987 | Iwasaki et al. | 350/341 |
| 4,639,089 | 1/1989 | Okada et al. | 350/341 |
| 4,641,924 | 2/1987 | Nagae et al. | 350/339 R |
| 4,664,480 | 5/1987 | Geary et al. | 350/350 S |
| 4,682,858 | 7/1987 | Kanbe et al. | 350/350 S |
| 4,720,173 | 1/1988 | Okada et al. | 350/341 |
| 4,939,003 | 7/1990 | Aoki et al. | 428/1 |
| 4,943,145 | 7/1990 | Miyata | 350/354 |
| 4,943,606 | 7/1990 | Inoue et al. | 523/457 |

FOREIGN PATENT DOCUMENTS

| | | | |
|---|---|---|---|
| 0059790 | 9/1982 | European Pat. Off. | 350/340 |
| 0091661 | 10/1983 | European Pat. Off. | 350/340 |
| 0160302 | 11/1985 | European Pat. Off. | 350/340 |
| 177271 | 4/1986 | European Pat. Off. | 252/299.4 X |
| 3427597 | 2/1985 | Fed. Rep. of Germany | 350/340 |
| 54-101339 | 8/1979 | Japan | 252/299.4 X |
| 57-040226 | 3/1982 | Japan | 252/299.4 X |

*Primary Examiner*—Robert L. Stoll
*Assistant Examiner*—Richard Treanor
*Attorney, Agent, or Firm*—Antonelli, Terry, Stout & Kraus

[57] ABSTRACT

A ferroelectric liquid crystal device which comprises at least one pair of counterposed substrates, a ferroelectric liquid crystal material provided between the substrates, means for applying an electric field to the liquid crystal material and provided at the substrates, an alignment-controlling layer provided on the surface on the liquid crystal material side of each of the substrates, and a sealing member at the peripheral edges of the substrates, the alignment-controlling layer being a film of an organic polymer whose $\beta$ dispersion temperature is higher than the curing temperature of a sealant for the sealing member, preferably at least 200° C., has a good alignment state of ferroelectric liquid crystal molecules achieved by cooling alone without any application of an electric field and has good display qualities such as a high contrast.

4 Claims, 2 Drawing Sheets

FERROELECTRIC LIQUID CRYSTAL DEVICE

This application is a Divisional of application Ser. No. 849,382, filed Apr. 8, 1986 now abandoned.

BACKGROUND OF THE INVENTION

This invention relates to a ferroelectric liquid crystal device, and particularly to a ferroelectric liquid crystal with a good alignment of ferroelectric liquid crystal.

The liquid crystal devices so far used in watches, electronic pocket calculators, etc. are based mainly on the display according to the twisted nematic (TN) mode where the nematic liquid crystals are in a twisted structure, but the response speed is now limited to 20 milliseconds at the highest in this mode. On the other hand, display based on smectic liquid crystals has been actively tried, and particularly liquid crystals having a smectic C* phase, which may be represented also by Sm* C phase or called chiral smectic C phase, or a smectic H* phase, which may be represented also by Sm* H phase or called chiral smectic H phase, have been regarded as important owing to the ferroelectricity since Meyer et al discovered it [Le Journal de Physique-Letters 36, L 69 (1975)]. These liquid crystals were found to have a high speed response of less than 1 millisecond by Clark et al [Appl. Phys. Lett) 36, 899 (1980)] and new fields have been expected for these liquid crystals.

It is important that devices utilizing these ferroelectric liquid crystals must be aligned in some preferential directions in parallel to the substrate surface. The well known procedures for aligning the ferroelectric liquid crystals utilize an application of a strong magnetic field or a shear stress, but are less practical as a production process. Fukuda et al proposed an alignment from the spacer edge ["Shizen", July issue (1983), pages 36–46; "Optronics", September issue, (1983), pages 64–70], but the domain for uniform alignment is as narrow as 100 μm from the edge and is practically not satisfactory.

On the other hand, the ferroelectric liquid crystal cannot have so far had a uniform alignment even by alignment used in the alignment of the conventional nematic liquid crystal or cholesteric liquid crystal such as oblique vapor deposition of silicon oxide (SiO) (Japanese Patent Publication No. 54-12067) or the so-called rubbing, i.e. rubbing of an organic polymer film with cloth, etc., in a specific direction (Japanese Patent Publication No. 55-10180), and thus there is a problem of poor contrast ratio.

A process for aligning a ferroelectric liquid crystal by using an imide-based polymer and applying an electric field thereto together has been proposed [Japanese Patent Application Kokai (Laid-open) No. 58-173718], where a PIQ (polyimidoisoindroquinazolinedione, trademark of a product made by Hitachi Chemical Co., Ltd., Japan) film is rubbed and a liquid crystal is once brought into an isotropic liquid state, and slowly cooled while applying a strong electric field thereto, thereby obtaining a uniform alignment.

To solve these problems, the present inventors have made extensive studies on the uniform alignment of a ferroelectric liquid crystal to be attained only by rubbing, as in case of the nematic liquid crystal of the conventional type, without any application of an electric field, and have found that a uniform alignment can be obtained without any application of an electric field when a specific organic polymer film is used as an alignment-controlling layer. The present invention is based on this finding.

SUMMARY OF THE INVENTION

An object of the present invention is to provide a ferroelectric liquid crystal device having a high-contrast ratio.

According to a first aspect of the present invention, there is provided a ferroelectric liquid crystal device which comprises at least one pair of counterposed substrates, a ferroelectric liquid crystal material provided between the substrates, means for applying an electric field to the liquid crystal material and provided at the substrates, an alignment-controlling layer provided on the surface on the liquid crystal material side of each of the substrates, and a sealing member at the peripheral edges of the substrates, the alignment-controlling layer being a film of an organic polymer whose $\beta$ dispersion temperature is higher than the curing temperature of a sealant for the sealing member.

According to a second aspect of the present invention, the said alignment controlling layer is an organic polymer film whose $\beta$ dispersion temperature is preferably at least 200° C.

That is, in the present invention, a polymeric material for the alignment-controlling layer to be formed on a substrate surface is selected on the basis of its $\beta$ dispersion temperature.

Temperature dispersion of viscoelastic function corresponds to local microscopic Brownian motions of polymer molecules, i.e. microscopic Brownian motions of parts, particularly, side chain parts of polymer molecules, but it has been rarely clarified yet which molecular behavior mode the respective dispersion belongs to, that is, which side chains of the molecules undergo motions taking part in the respective dispersion.

Generally, the dispersions are called $\alpha$, $\beta$, $\gamma$, . . . , successively in the order from the highest temperature side towards the lower temperature side, and $\alpha$ dispersion corresponds to the characteristics of the so called glass transition, and the $\alpha$ dispersion temperature corresponds to a glass transition point (Tg). $\beta$ dispersion can be regarded as a local molecular behavior mode freezed up to a high temperature, next to the glass transition, and the peak temperature at which the $\beta$ dispersion can be highly retained is referred to as a $\beta$ dispersion temperature. For example, the microscopic Brownian motion can be kept completely inactive, i.e. can be completely freezed up to the $\beta$ dispersion temperature.

The $\alpha$ dispersion or Tg (glass transition point) belongs to the primary dispersion, whereas the $\beta$ dispersion or the $\beta$ dispersion temperature belongs to the secondary dispersion.

A phenomenon that the dynamic viscoelectric function changes with a frequency $\Omega$ is called a frequency dispersion. When the frequency dispersion is taken into account, storage modulus $G'$ ($\Omega$) (real number part of complex modulus) suddenly changes in some $\Omega$ region with temperature, but usually fails to distinguish the peak of the $\beta$ dispersion. Loss modulus $G''$ ($\Omega$) (imaginary number part of complex modulus), also changes correspondingly, but fails to distinguish the peak of the $\alpha$ dispersion as a primary dispersion.

On the other band, calculation of a loss tangent $G''/G'$ can distinguish both of the $\alpha$ dispersion and the $\beta$ dispersion. When there appear a plurality of peaks in the changes in $G''/G'$ with temperature, the first peak at the higher temperature side is called an $\alpha$ dispersion, the second peak next thereto a β dispersion, the third peak a γ dispersion, and so on.

When the peak of the β dispersion has some plateau, i.e. flat top, in the temperature axis direction, its average (at the center) is defined as a peak of the β dispersion in the present invention.

The ordinary procedure for producing liquid crystal devices includes exposure to a high temperature, for example, exposure to usually 120°–170° C. for 1–2 hours for curing a sealant after rubbing an alignment-controlling layer, and to usually at least 100° C. for 30 minutes to one hour for introducing a liquid crystal material into the cell, i.e. the temperature at which the liquid crystal material is brought into an isotropic liquid state.

As a result of further studies, the present inventors have found that the polymers whose β dispersion temperature is less than 200° C. changes in the arrangement of polymer molecules in a microscopic region after the rubbing, resulting in a change in the alignment control of ferroelectric liquid crystal, whereas no such phenomenon appears in case of the polymers whose β dispersion temperature is at least 200° C., and a contrast ratio (ratio of bright/dark, i.e. 50) equal or superior to that of the PIQ film with an application of an electric field can be obtained. That is, in the present invention, the material for the alignment-controlling layer is selected on the basis of the β dispersion temperature of the material, and a material whose β dispersion temperature is higher than the curing temperature of a sealant, preferably at least 200° C. is used for the alignment-controlling layer. In other words, it is possible to use a material whose β dispersion temperature is less than 200° C., so long as not so high contrast ratio is required, but it is essential that the β dispersion temperature is higher than the curing temperature of a sealant.

The material for the alignment-controlling layer for use in the present invention is polyimide-based polymers having a good compatibility with ferromagnetic liquid crystal molecules, whose β dispersion temperature is higher than the curing temperature of a sealant, preferably at least 200° C., and includes polyimides obtained by baking a polyamide-acid varnish prepared by condensation of a diamine compound with an acid anhydride such as biphenyltetracarboxylic anhydride, pyromellitic anhydride, and benzophenonetetracarboxylic anhydride, for example:

poly[(2-methyl-1,4-phenylene)-3,3',4,4'-biphenylenetetracarboxyimide],
poly[(2-methyl-1,4-phenylene)pyromellitimide],
poly[(2,7-fluorenylene)pyromellitimide],
poly[(biphenylene)-3,3',4,4'-biphenyltetracarboxyimide],
poly[1,4-phenylene-3,3',4,4'-biphenyltetracarboxyimide],
poly[(2-methyl-1,4-phenylene)benzophenonetetracarboxyimide],
poly[(2,7-fluorenylene)benzophenonetetracarbxyimide],
poly[(2,7-fluorenylene)-3,3',4,4'-biphenyltetracarboxyimide],
poly(3,3'-dimethyl-4,4'-biphenylene)-3,3',4,4'-biphenyltetracarboxyimide],
poly[(terphenylene)-3,3',4,4'-biphenyltetracarboxyimide], and
poly[phenylenetrimellitamide-imide](the β dispersion temperature, which will be hereinafter referred to as "Tβ", of the foregoing polymers are all not less than 200° C.), and polyphenyleneterephthalamide (Tβ: 220° C.),
polyphenylene (Tβ: 250° C.),
polyoxadiazole (Tβ: 200° C.),
polyoxybenzoyl (Tβ: 230° C.),
polybenzamide (Tβ: 220° C.),
polyphenyleneoxadiazole (Tβ: 210° C.),
polybenzoimidazopyrrolone (Tβ: 210° C.),
polyisoindoquinazolinedion (Tβ: 240° C.), and
polyquinoxaline (Tβ: 270° C.).

In the present invention, the alignment-controlling layer of said organic polymer can be formed on a substrate generally by applying a solution containing the polymer or a precursor for the polymer to a substrate by brush coating, dipping, spinning, spraying, printing, or the like, then removing the solvent therefrom by heating, and, if necessary, conducting reaction with heating. The application is not restricted thereto, but the well known film-forming techniques such as vacuum vapor deposition, sputtering, etc. can be also used. After the formation of the polymer layer, the layer surface is rubbed in one direction with cloth, etc. to obtain an insulating, alignment-controlling layer.

The ferroelectric liquid crystal for use in the present invention is one having a Sm* C phase, a Sm* H phase, etc. and includes, for example, the following compounds, which can be used alone or in a combination thereof:

2-methylbutyl 4-(4-hexyloxybenzylidene)aminocinnamate,
2-methylbutyl 4-(4-octyloxybenzylidene)aminocinnamate
2-methylbutyl 4-(4-dodecyloxybenzylidene)aminocinnamate (so called DOBAMBC),
2-methylbutyl 4-(4-octyloxyphenyl)benzoate,
p-n-decyloxybenzylidene-p'-(2-methylbutyloxycarbonyl) aniline,
2-methylbutyl 4-(4-octyloxybenzoyloxy)benzoate, and

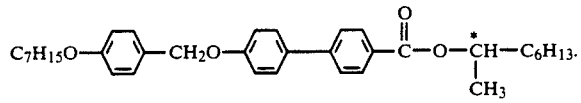

In the present invention, the liquid crystals can be brought into a liquid crystal state only by cooling without any application of an electric field after the introduction of the liquid crystals in an isotropic state into the cell. It is desirable that the temperature at which the liquid crystals are introduced into the cell is lower than the β dispersion temperature of the material for the alignment-controlling layer.

The sealant for the sealing member for use in the present invention is one whose curing temperature is less than the β dispersion temperature of the material for the alignment-ordering layer, preferably less than 200° C., and usually an epoxy resin.

It is usually preferable to provide a polarizing plate for each substrate. A polarizing plate can be used for each substrate or can be used together with guest-host liquid crystal.

The display mode for use in the present invention includes a double refraction mode and a guest-host mode.

The present ferroelectric liquid crystal device includes all the devices satisfying the requirements for the β dispersion temperature, irrespectively of display devices, photomodulating devices, etc.

PREFERRED EMBODIMENTS OF THE INVENTION

In the following Examples, the following conditions were employed.

(1) Procedure for measuring dynamic viscoelasticity

Reopexyanalyzer RPX 706 (made by Iwamoto Seisakusho K. K., Japan) was used in a tensile vibration mode at a frequency of 10 Hz and an amplitude of 15 μm, at a temperature-elevating speed of 1.5° C./min. and in a test temperature range of −180° to +400° C. The loss tangent of the dynamic viscoelasticity was obtained as a ratio of the real number part of complex modulus/the imaginary number part of complex modulus, and the β dispersion temperature was determined from the peak of the loss tangent.

(2) Composition of sealant and conditions for curing

As a sealant, an epoxy-based adhesive of the following composition was cured at 120° C. for 2 hours.

Main reagent: Epikote 828 (made by Mitsubishi Yuka K. K. Japan) 100 parts by weight Curing agent: Epomate B-001 (made by Ajinomoto K. K., Japan) 30 parts by weight Curing agent: Adeka EH 531 (made by Asahi Denka K. K., Japan) 30 parts by weight Silane coupling agent: Aminosilane A-1100 (made by Nippon Unicar K. K., Japan) 1.6 parts by weight Filler: Aerosil 2491/380 (made by Degussa, West Germany) 4.8 parts by weight (3) Conditions for introducing liquid crystal into cell The device and the liquid crystal material were kept at a predetermined temperature in vacuum, and, after the cell and the liquid crystal was degasified, the inlet to the cell in the device was dipped in the liquid crystal material. The device and the liquid crystal material were returned to the atmospheric pressure, thereby introducing the liquid crystal material into the cell. Then, the liquid crystal material introduced into the cell was spontaneously cooled. The predetermined temperature was a temperature by 20° to 30° C. higher than the temperature at which the liquid crystal material was brought into an isotropic liquid state. The predetermined temperature is given in each Example.

(4) Conditions for rubbing

A rotor, 55 mm in diameter, was wrapped with AB-labelled buffing cloth (type 40-7482, made by Buehler Ltd., USA) and was used for rubbing at 600 rpm.

Example 1

Figure 1:
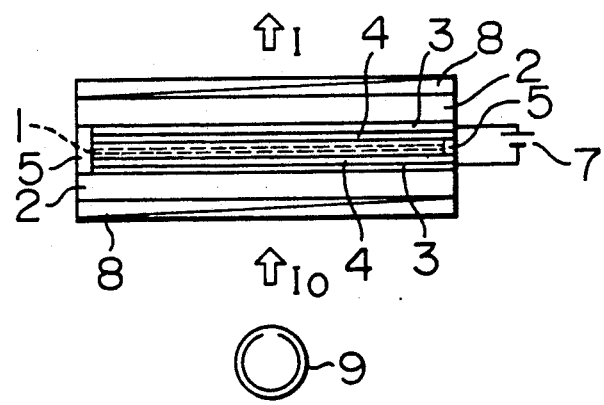
FIG. 1 is a cross-sectional view of a ferro-electric liquid crystal device according to an embodiment of the present invention.

A structural view of a typical liquid crystal device according to the present invention is given in FIG. 1, where polarizing plates 8 are provided on the outside of upper and lower substrates 2, so that the upper and the lower polarizing axes may be arranged at 90° to each other. Means 3 for applying an electric field to a liquid crystal material, i.e. electrodes, are provided on the inside surfaces of the respective substrates 2, and alignment-controlling layers 4 are provided on the respective electrodes 3. Numeral 5 is sealing members and 7 is a power source.

The device shown in FIG. 1 is of a transmission type, and thus the upper and lower substrates 2 can transmit a light. A fluorescent lamp 9 is provided at the outside of the device as a light source.

Figure 2:
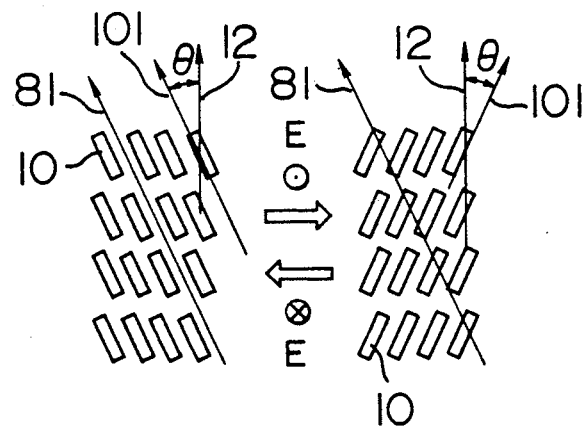
FIG. 2 is a schematic view of liquid crystal molecule alignment on each substrate of FIG. 1.

Movement of ferromagnetic liquid crystal molecules between the upper and lower substrates will be explained, referring to FIG. 2, where numeral 10 is liquid crystal molecules, 12 a rubbing direction, 81 a polarizing axis direction, 101 a long axis direction of liquid crystal molecules, B a tilt angle, and E an electric field direction.

Figure 3:
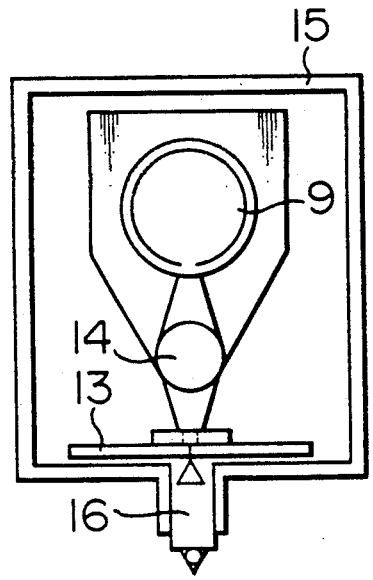
FIG. 3 is a cross-sectional view of a printer head of liquid crystal light switch array type in which the device according to the embodiment of FIG. 1 is incorporated.
Figure 4:
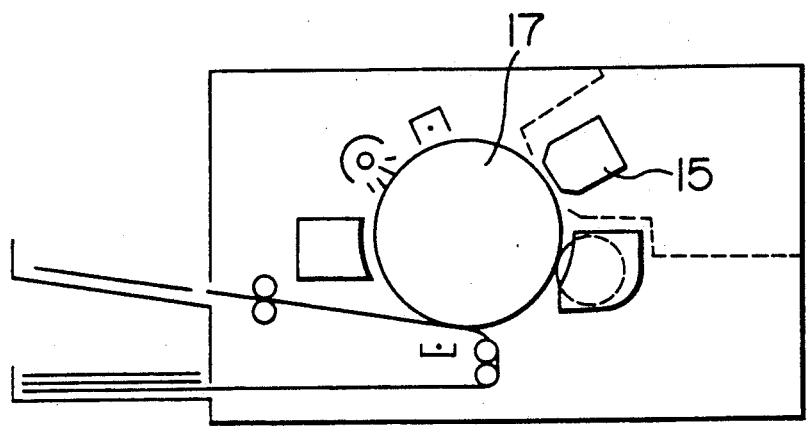
FIG. 4 is a schematic structural view of a printer in which the printer head of FIG. 3 is incorporated.

A printer head of liquid crystal light switch array type, to which said device is applied, is schematically shown in FIG. 3, and a laser beam printer, to which said printer head is applied, is schematically shown in FIG. 4.

In FIG. 3, the device of the present invention is used as a liquid crystal light switch array 13. A rod lens 14 is provided between the liquid crystal light switch array 13 and a fluorescent lamp 9, and a SEL FOC ® lens array 16 (Nippon Sheet Glass Co., Ltd., Japan) is provided at the outlet of a box 15 encasing these members, that is, the light outlet of liquid crystal light switch array 13.

The box 15 is arranged at the position to a photosensitive drum 17 as shown in FIG. 4, where a light source is a color fluorescent lamp, having a printing speed of 80 mm/sec. (corresponding to 1,000 lines/min.), degree of resolution 10 dots/min., printing span 205 mm (corresponding to A4 size), and the dimension of box 15 is 456 mm long × 350 mm wide × 60 mm high.

The printer head utilizing the liquid crystal light switch is of a solid, light scanning type without any mechanical scanning part, and thus an electrophotographic printer can be made smaller by using such a printer head.

The printer head of liquid crystal light switch array type in the laser beam printer comprises a light switch array panel using a ferroelectric liquid crystal of high response speed and a lens system. The liquid crystal light switch array is composed of 2,048 light switches arranged in line at a pitch of 10 switches/mm. By high speed switching the light from the fluorescent lamp 9 through the individual switches, a printing pattern can be exposed to the photosensitive drum 17.

The device 13 of the present invention as the liquid crystal panel is prepared in the following manner:

The alignment-controlling layer 4 is formed from polyimide (β dispersion temperature: 268° C.) obtained by baking a polyamide-acid varnish prepared by condensation of 3,3',4,4'-biphenyltetracarboxylic anhydride and 2,5-diaminotoluene. The layer thickness is about 70 nm, and the repetition unit of the polyimide is given by the following formula:

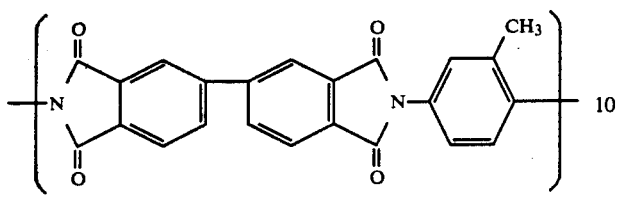

The baking condition is 100° C./one hour —200° C./one hour —350° C./30 minutes (in a nitrogen gas atmosphere only for baking at 350° C.).

The alignment-controlling layers on the two substrates are rubbed and counterposed to each other while keeping the rubbing directions in parallel to each other. The device is assembled by inserting a glass fiber spacer having a thickness of 10 μm between two substrates and the liquid crystal material is introduced into the cell.

The liquid crystal material consists of a mixture of the following compounds in a molar ratio of 1 : 1, and the device and the liquid crystal material are kept at 80° C. in vacuum for degasification. Then, the inlet to the cell of the device is dipped in the liquid crystal material, and then the device and the liquid crystal material are returned to the atmospheric pressure.

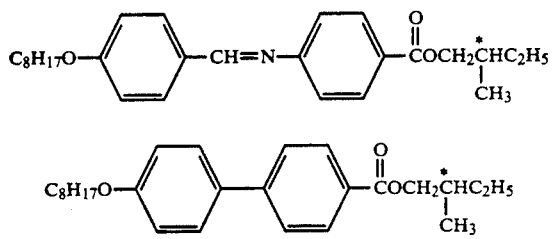

After the introduction of the liquid crystal material into the cell, the device is slowly cooled (0.5° C./min.) from the isotropic liquid phase to a chiral smetic phase temperature showing a ferroelectricity (20°-34° C.) to obtain the ferroelectric liquid crystal device 18.

Figure 5:
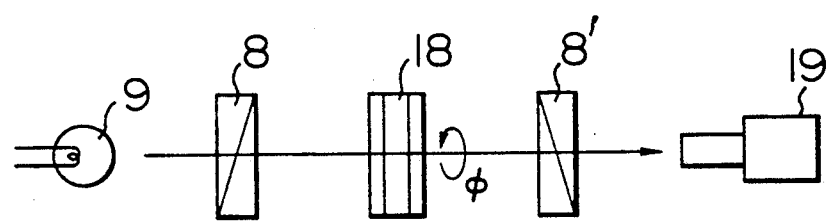
FIG. 5 is a schematic structural view of a tester for evaluating an alignment state of liquid crystal.

The alignment state of the device is determined by a test apparatus shown in FIG. 5, where a light source (fluorescent lamp) 9, a first polarizer 8, the device 18, a second polarizer 8', and a light intensity detector 19 are provided on one aixs. The polarization axis of the first polarizer 8 and that of the second polarizer 8' are crossed with each other at a right angle, and both polarizers 8 and 8' are fixed, whereas the liquid crystal device 18 is rotatable.

Figure 6:
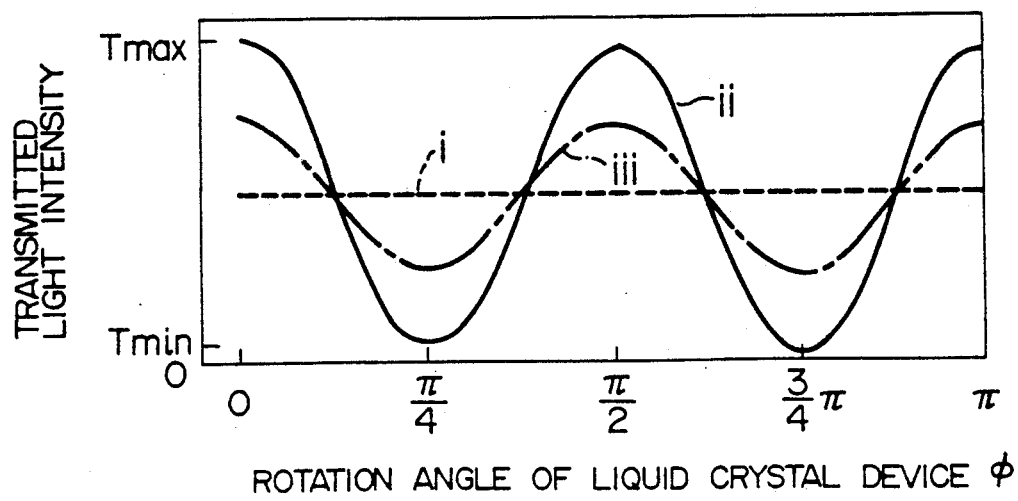
FIG. 6 is a characteristic diagram showing relationship between the rotation angle of a liquid crystal device and the transmitted light intensity.

FIG. 6 is a characteristic diagram showing relationship between the rotation angle φ of liquid crystal device 18 and the transmitted light intensity, where curve i shows non-alignment, curve ii a good alignment, and curve iii a poor alignment. The contrast ratio $C^o_R$ as a parameter for good and poor alignments is a ratio of the transmitted light intensity $T_{max}$ to $T_{min}$, i.e. $C^o_R = T_{max}/T_{min}$.

Determination of the alignment state of the present device of Example 1 reveals a good alignment state and the contrast ratio as the parameter for alignment state is 1,000.

Example 2

A liquid crystal device is prepared in the same manner as in Example 1, except that a polyamide-acid varnish whose tetracarboxylic acid component is pyromellitic acid is used. The repetition unit of the polymer is given by the following formula:

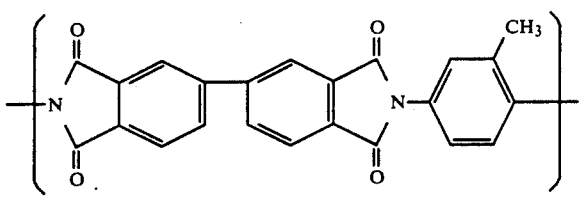

Baking conditions are 100° C./one hour—200° C./one hour—350° C./30 minutes (in a nitrogen gas atmosphere only for 350° C.

The predetermined temperature for the introduction of the liquid crystal material into the cell is the same 80° C. as in Example 1.

The β dispersion temperature in the temperature dispersion of viscoelectric function of polyimide obtained by baking is 230° C.

Determination of the alignment state reverals a good alignment state, and the contrast ratio as the parameter for alignment state is 60.

Example 3

As the alignment-controlling layer 4 as shown in FIG. 1, polyphenylene having a thickness of 800 Å with the following repetition unit is provided by coating a solution containing a polyphenylene precursor in toluene by a spinner, and baking the coating at 250° C./2 hours:

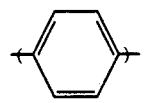

The coating layers on the two substrates are rubbed in the same manner as in Example 1, and a liquid crystal device is assembled by inserting a glass fiber spacer having a thickness of 10 μm between the substrates in the same manner as in Example 1.

The following liquid crystal materials are introduced into the cell at the predetermined temperature of 140° C. in place of 80° C. in Examples 1 and 2. The liquid crystal mixture shows a chiral smectic C phase at 0° to 54° C.

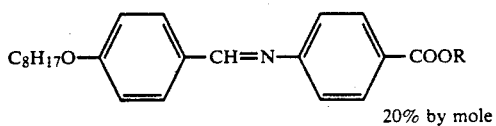

20% by mole

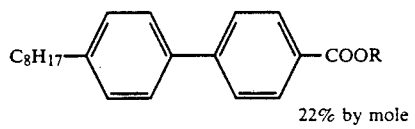

22% by mole

-continued

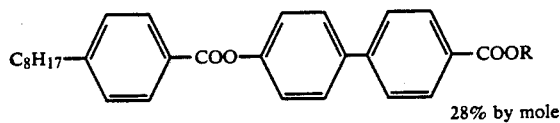

28% by mole

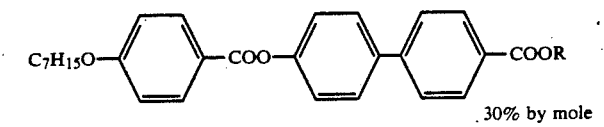

30% by mole where R represents

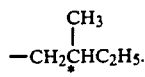

After the introduction of the liquid crystal mixture, the device is slowly cooled from the isotropic liquid phase to a chiral smectic C phase temperature showing a ferroelectricity, whereby a ferroelectric liquid crystal device is obtained. Determination of the alignment state in the device reveals a good alignment state and the contrast ratio as the parameter for alignment is 65.

Example 4

A polyoxadiazole varnish is applied to electrode substrates by dipping and removing the solvent therefrom, and the substrates each having a polyoxazole layer is obtained. The repetition unit of the polymer is

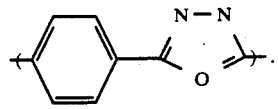

After rubbing treatment in the same manner as in Example 1, a liquid crystal device is assembled, and the liquid crystal material is introduced into the cell in vacuum at the same predetermined temperature of 140° C. as in Example 3. As the liquid crystal material, 2-methylbutyl 4-(4-dodecyloxybenzylidene) aminocinnamate is used. After slow cooling of the device from the isotropic liquid phase, the alignment state in the device is evaluated at 76° to 95° C. at which a ferroelectricity dominates. The device has a good alignment state and the contrast ratio as the parameter for alignment is 80.

As described above, a good alignment state of ferroelectric liquid crystal molecules can be obtained in the present invention, and thus a ferroelectric liquid crystal device of good display qualities such as a high contrast, etc. can be effective obtained.

What is claimed is:

1. A ferroelectric liquid crystal device which comprises at least one pair of counterposed substrates, a ferroelectric liquid crystal material provided between the substrates, means for applying an electric field to the liquid crystal material and provided at the substrates, an alignment-controlling layer provided on the surface on the liquid crystal material side of each of the substrates, and a sealing member at the peripheral edges of the substrates, the alignment-controlling layer being a film of polyphenylene.

2. A ferroelectric liquid crystal device according to claim 1, wherein a sealant for the sealing member is an epoxy resin.

3. A ferroelectric liquid crystal device according to claim 1, wherein a polarizing plate is provided at least at one of the substrates.

4. A ferroelectric liquid crystal device according to claim 2, wherein the sealant has a curing temperature less than a $\beta$ dispersion temperature of the organic polymer.

* * * * *